United States Patent

Kerr et al.

[15] 3,702,377

[45] Nov. 7, 1972

[54] APPARATUS FOR CONVERTING SUPPRESSED CARRIER CHROMINANCE SIGNALS INTO PAL FORMAT

[72] Inventors: James A. Kerr; Bernhard J. Rogers, both of London; Leslie J. Sutherland, Harrow, all of England

[73] Assignee: The Rank Organisation Limited, Millbank, London, England

[22] Filed: Sept. 18, 1970

[21] Appl. No.: 73,349

[30] Foreign Application Priority Data

Sept. 18, 1969 Great Britain..........46,124/69

[52] U.S. Cl...............................................178/5.4 P

[51] Int. Cl...............................................H04n 9/36

[58] Field of Search..................................178/5.4 P

[56] References Cited

UNITED STATES PATENTS

| | | | |
|---|---|---|---|
| 2,831,917 | 4/1958 | Jacobs, Jr. | 178/5.4 P |
| 3,073,894 | 1/1963 | France | 178/5.4 P |

*Primary Examiner*—Robert L. Griffin
*Assistant Examiner*—Donald E. Stout
*Attorney*—Holcombe, Wetherill & Brisebois

[57] ABSTRACT

Suppressed carrier chrominance signal is translated to a desired frequency and in PAL form using a pilot signal at a sub-multiple of carrier frequency. Sum and difference signals are formed from a carrier frequency harmonic of the pilot and a wave at the desired frequency and appear alternately from line to line. These are combined with the chrominance signal to provide a desired PAL signal.

6 Claims, 1 Drawing Figure

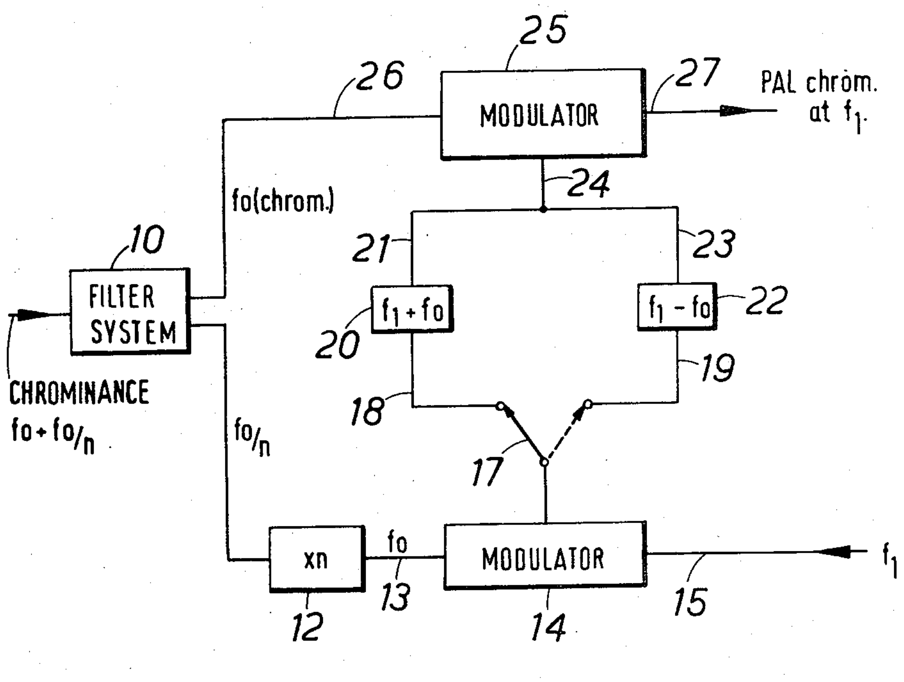
25
26
MODULATOR
27
PAL chrom. at $f_1$.
24
fo(chrom.)
10
21
23
FILTER SYSTEM
$f_1 + fo$
$f_1 - fo$
22
20
19
18
CHROMINANCE $fo + fo/n$
$fo/n$
17
xn
fo
MODULATOR
$f_1$
13
15
12
14

APPARATUS FOR CONVENTING SUPPRESSED CARRIER CHROMINANCE SIGNALS INTO PAL FORMAT

The invention relates to translating color television signals to a desired frequency and providing them in PAL form.

Various recording processes for color television signals using quadrature modulation employ a pilot tone process for the chrominance signal. A suppressed carrier signal carries information concerning the two color difference signals, the respective two carriers being in quadrature.

A reference wave at the suppressed carrier frequency is attained using a pilot signal at a sub-multiple of the suppressed carrier frequency, which pilot signal was simultaneously recorded at a suitable level. In relaying such a recording, errors of frequency due to variations of the speed of the record medium can be eliminated by demodulating the recorded chrominance signal against a carrier reference wave obtained as a suitable harmonic of the recorded pilot signal.

It is commonly necessary to translate such a recorded signal to a frequency similar to that used for the chrominance carrier in normal broadcast color television transmissions It is generally desirable for such translation to be achieved without demodulation to baseband and frequently the translation is desired in PAL form.

According to one aspect of the invention, there is provided a method of translating a suppressed carrier chrominance signal to a desired frequency and in PAL form using a pilot signal at a sub-multiple of the suppressed carrier, comprising the steps of obtaining a harmonic of the pilot signal at suppressed carrier frequency, deriving the sum and difference of said harmonic and a wave appropriate to said desired frequency so that the sum and difference signals appear alternately from line to line, and using said alternate signals to provide from the suppressed carrier color difference signals a PAL signal at the desired frequency.

According to another aspect of the invention there is provided apparatus for translating a suppressed carrier chrominance signal to a desired frequency and in PAL form using a pilot signal at a sub-multiple of the suppressed carrier, comprising means for obtaining a harmonic of the pilot signal at suppressed carrier frequency, means for deriving the sum and difference of said harmonic and a wave appropriate to said desired frequency, so that the sum and difference signals, appear alternately from line to line, and means responsive to said alternate signals and the suppressed carrier color difference signals to provide a PAL signal at the desired frequency.

A suitable frequency multiplier may be incorporated to provide the required pilot signal harmonic. Furthermore, suitable filter means is advantageous for separating the suppressed carrier color difference signals and the pilot signal from a composite signal which would result from playing back a recording such as discussed above.

One convenient way of performing said deriving is to mix said wave and harmonic and to switch between the two resulting products using a pair of filters selected on a line by line basis. For elimination of color difference signal sign alternation, the switching is caused to execute either one extra cycle or one fewer cycle during blanking intervals of the signals to be translated.

One embodiment of the invention will now be particularly described, by way of example, with reference to the accompanying drawing which represents, in block form, a circuit for achieving frequency translation and providing an output chrominance signal in PAL form.

In the drawing, a filter system 10 is effective to separate suppressed carrier chrominance signals corresponding to color difference signals $E_u'$ and $E_v'$ and a pilot signal $fo/n$ at a sub-multiple of the suppressed carrier $fo$. The composite input signal may constitute the output of playback apparatus for recorded chrominance signals. The pilot signal $fo/n$ is passed via path 11 to a frequency multiplier 12 for providing a harmonic of the pilot signal at suppressed carrier frequency $fo$. The output 13 of frequency multiplier 12 is connected as one input of a modulator 14 connected to receive at its other input 15 a carrier wave at the frequency $f_1$ to which translation of the chrominance signal input to the filter system 10 is desired.

The output 16 of modulator 14 passes to the input of a switch 17 which may take any convenient form and will generally be electronic, it being shown only diagrammatically. On a line by line basis the switch 17 provides the output of the modulator 14 alternately on line 18 and line 19. Thus, on alternate lines a filter 20 connected to line 18 provides the sum of the pilot frequency harmonic $fo$ and the desired frequency wave $f1$ on line 21. On intervening lines a filter 22 provides the difference between those signals on line 23.

Lines 21 and 23 are connected in common to one input 24 of a modulator 25 having its other input 26 connected to receive the chrominance signals from the filter system 10.

Due to the alternation of the sum and difference signals from filters 20 and 22, respectively, on a line by line basis the modulator 25 is, when those signals are suitably related in phase, effective to provide at its output a PAL system chrominance signal where temporally sequential lines have a conjugate complex relation with reference to a defined phase axis, normally the axis of the $E_u'$ signal. The output of the modulator 25 will thus be the required signal alternating in phase with respect to the $E_u'$ axis, i.e. alternation occurs of the $E_v'$ signal on a line by line basis.

The alternation of sign required of the V-quadrature chrominance component in the PAL-type signal results directly from the balanced modulator action and the line-rate switching of the modulator output between the filters 20 and 22. The sequence of operations involved is readily demonstrated by the following analysis:

It is assumed that the desired PAL signal at the output of the modulator 25 is represented by:

$$Ec = E'u \cos w_s t \pm E'v \sin w_s t \quad (1)$$

where the ± sign indicates the alternation of the E'v component.

Equation 1 can be rewritten as:

$$Ec = E's \cos (w_s t \pm \phi) \quad (2)$$

where $$E's = \sqrt{(E'u)^2 + (E'v)^2} \quad (3)$$

and $|\phi| = \tan^{-1} \frac{E'v}{E'u}$ (4)

It is also assumed that the available input chrominance signal from an EVR player is represented by:

$$E'c = E's \cos (w_{e\,t} - \phi) \quad (5)$$

Compared with the drawings, $2\phi f_1 = w_s$ and $2\pi f_0 = w_e$, giving the $w_s$ and $w_e$ values used above. Obviously, the object of the invention is to convert signals represented by Equation 5 into corresponding signals represented by Equation 2 without reverting to baseband demodulation.

In operation, modulator 14 produces two carrier waves at frequencies $f_1 + f_0 = (w_s/2\pi) + (w_e/2\pi)$ and $f_1 - f_0 = (w_s/2\pi) - (w_e/ac\pi)$. The two carrier waves are gated alternately at line rate to modulator 25, which also receives a signal $E'c$ according to Equation 5.

When modulator 25 is receiving the $f_1 + f_0 = (w_s/2\pi) + (w_e/2\pi)$ signal, it produces a signal $Ec$ such that $$Ec = [2 \cos (w_s + w_e)t]\,[E's \cos (w\xi_e t - \phi)] = E's \cos [(w_s + w_e)t - (w_e t - \phi)] + E's \cos [(w_s + w_e)t + (w_e t - \phi)]$$

which reduces to $$Ec = E's \cos (w_s t + \phi X) + E's \cos [(w_s + 2w_e)t - \phi] \quad (6)$$

The term $E's \cos w_s t + \phi)$ is the desired signal with the phase element $\phi$ reversed in sign. This signal, as a result of the action of switch 17, will appear on alternate lines, that is, on every second line at the output of modulator 25. The other term $E's \cos [(w_s + 2w_e)t - \phi]$ is removed by conventional filtering.

When modulator 25 is receiving the $f_1 - f_0 = (w_s/2\pi) - (w_e/2\pi)$ signal, it produces a signal $EC$ such that $$Ec = [2 \cos (w_s - w_e)t]\,[E's \cos (w_e t - \phi)] = E's \cos [(w_s + w_e)t - (w_e t - \phi)] + E's \cos [(w_s - w_e)t + (w_e t - \phi)]$$

which reduces to $$Ec = E's \cos [(w_s - 2w_e)t + \phi] + E's \cos (w_s t - \phi) \quad (7)$$

The second term on the right hand side of Equation 7 is the desired signal with the phase element unchanged in sign. This component is similarly selected and the other component $E's \cos [(w_s - 2w_e)t + \phi]$ is rejected.

The resulting signal at the output of the modulator 25 is as follows:

$$Ec = E's \cos (w_s t \pm \phi) + E's \cos (w_s t - \phi),\ \text{or}\ Ec = E's \cos (w_s t \pm \phi), \quad (8)$$

the two components appearing alternatively from line to line. The desired translation of frequency has thus been accomplished.

This analysis ignores static phase shifts introduced during the various operations performed prior to the action of the modulator 25. These will occur between the signals on the two paths from the signal separator and the two line-rate switched carriers on Line 21 and 23. These phase shifts need to be of amounts consistent with achieving coincidence of the zero phase condition for both line-rate switched carriers. This is achieved in a conventional manner by delays designed into the separating filters.

We claim:

1. A method of translating a suppressed carrier chrominance signal to a desired frequency and in PAL form using a pilot signal at a submultiple of the suppressed carrier, comprising the steps of obtaining a harmonic of the pilot signal at suppressed carrier frequency, deriving the sum and difference signals of said harmonic and a wave at said desired frequency so that the sum and difference signals appear alternately from line to line, and using said alternate sum and difference signals to translate the suppressed carrier signal into a color signal of PAL signal format having a carrier frequency of the desired frequency.

2. A method according to claim 1, wherein the deriving step comprises mixing said wave and said harmonic switching between the two resulting products using a pair of filters selected on a line by line basis.

3. Apparatus for translating a suppressed carrier chrominance signal to a desired frequency and in PAL form using a pilot signal at a submultiple of the suppressed carrier, comprising means for obtaining a harmonic of the pilot signal at suppressed carrier frequency, means for deriving the sum and difference of said harmonic and a wave at said desired frequency so that the sum and difference signals appear alternately from line to line, and means responsive to said alternate sum and difference signals and the suppressed carrier chrominance signal to translate the suppressed carrier signal into a color signal of PAL format having a carrier frequency of the desired frequency.

4. Apparatus according to claim 3, wherein there is included in the means for deriving, means for mixing said harmonic and said wave, a pair of filters having passbands respectively centered on the respective frequencies of said sum and difference signals, and means for switching the products of said mixing between the pair of filters on a line by line basis.

5. Apparatus according to claim 3, comprising means for separating said suppressed carrier chrominance signal and the pilot signal from a composite input signal.

6. Apparatus according to claim 3, wherein there is included in the means for obtaining, a frequency multiplier for multiplying the pilot signal frequency.

* * * * *